(12) United States Patent
Cimenti et al.

(10) Patent No.: US 7,604,447 B2
(45) Date of Patent: Oct. 20, 2009

(54) HOPPER-LOADING METHOD AND INSTALLATION

(75) Inventors: Giovanni Cimenti, Bertrange (LU); Emile Lonardi, Bascharage (LU); Guy Thillen, Diekirch (LU)

(73) Assignee: Paul Wurth S.A., Luxembourg (LU)

( * ) Notice: Subject to any disclaimer, the term of this patent is extended or adjusted under 35 U.S.C. 154(b) by 525 days.

(21) Appl. No.: 10/542,581

(22) PCT Filed: Jan. 20, 2004

(86) PCT No.: PCT/EP2004/000421

§ 371 (c)(1),
(2), (4) Date: Jul. 19, 2005

(87) PCT Pub. No.: WO2004/065640

PCT Pub. Date: Aug. 5, 2004

(65) Prior Publication Data

US 2006/0182617 A1    Aug. 17, 2006

(30) Foreign Application Priority Data

Jan. 21, 2003    (LU) ......................................... 91000

(51) Int. Cl.
*B65G 65/00* (2006.01)
(52) U.S. Cl. ...................... 414/299; 414/804
(58) Field of Classification Search ................. 414/150, 414/195, 208, 299–302, 152, 160, 172, 194, 414/804

See application file for complete search history.

(56) References Cited

U.S. PATENT DOCUMENTS

| 4,397,423 | A | * | 8/1983 | Beaver et al. ............... 239/684 |
| 4,469,216 | A | | 9/1984 | Haataja et al. |
| 6,811,020 | B2 | * | 11/2004 | Bailey ....................... 198/642 |
| 2002/0136619 | A1 | * | 9/2002 | Baroncini ................... 414/300 |

FOREIGN PATENT DOCUMENTS

| DE | 29513785 | 12/1995 |
| GB | 2090216 | 7/1982 |
| JP | 58087213 | 5/1983 |

* cited by examiner

*Primary Examiner*—Donald Underwood
(74) *Attorney, Agent, or Firm*—McCormick, Paulding & Huber LLP

(57) ABSTRACT

A device for distributing loose materials, arranged in a curtain of loose material tipped out from a means of conveying loose material includes a box with a top opening, at least one wall which extends transverse to the curtain of material inside the box to subdivide the box into at least two compartments, and at least two tipping-out means, one of the tipping-out means being associated with each of the compartments of the box, the tipping-out means being directed in such a way as to deflect the material received in the respective compartments into a distinct region of the hopper. The method for loading a hopper includes tipping loose material out in the form of a curtain of material over the hopper and splitting the curtain into at least two partial streams so as to deflect each of the partial streams towards a distinct region of the hopper.

19 Claims, 5 Drawing Sheets

HOPPER-LOADING METHOD AND INSTALLATION

CROSS-REFERENCE TO RELATED APPLICATIONS

This application is entitled to the benefit of International Application No. PCT/EP04/00421 filed on Jan. 20, 2004, and Luxembourg Patent Application No. 91 000 filed on Jan. 21, 2003.

FIELD OF THE INVENTION

The present invention relates to a hopper loading installation, particularly in a shaft furnace loading installation.

BACKGROUND OF THE INVENTION

To guarantee optimum charging of a shaft furnace, it is desirable for the materials stored in the storage hopper to be distributed fairly uniformly. However, it is difficult to distribute the charge materials uniformly in the hopper because of the particle size of the charge material. The problem is that the charge material, whether it be iron ore particles or coke particles, has a varying and non-uniform particle size. As the material is conveyed towards the hopper, for example via a conveyor belt, the fine particles have a tendency to build up in larger proportions at the bottom of the layer of conveyed material, while the large particles remain in the upper part of the layer.

It then follows that when the material is tipped out of the conveyor belt, the material drops in the form of a curtain of a certain width, of which the rear layer, viewed in the direction of conveying, contains a predominance of large particles while the front layer contains more fine particles. This distribution of the particles in the curtain of material has the effect that, after loading, the rear part of the hopper, viewed in the direction in which the material is conveyed, contains more large particles than the front part and that the distribution of material is therefore distinctly non-uniform.

In addition, when the charge material impacts the hopper, a natural pouring cone is formed around the fall line. The largest and heaviest particles therefore have a tendency to tumble along the slopes of this cone, under the influence of their weight, toward the peripheral regions of the chamber. By contrast, the smallest particles, known as "fines" have a tendency to remain in the central region of the pouring cone. This phenomenon further accentuates the segregation of the material within the hopper.

To solve this problem, it has been proposed that the hopper be made to revolve about a vertical axis during loading. By virtue of the rotation of the hopper, the effects of the segregation in the curtain of material on the distribution of the material in the hopper can be reduced. Unfortunately, the segregation of the material due to the pouring cone within the hopper cannot be reduced. Such a rotary hopper cannot therefore meet the requirements of uniform charging of a shaft furnace. In addition, such a rotary hopper needs to be housed in the framework of the shaft furnace on rolling bearings. Given the size and weight of such a hopper, this step entails a considerable investment and poses problems in terms of installation maintenance.

OBJECTS AND SUMMARY OF THE INVENTION

The purpose of the present invention is to propose a method for loading a hopper, which leads to a better distribution of the material in the hopper. Another object of the invention is to propose a device for distributing loose material and a loading installation which allow this method to be performed.

According to the invention, this objective is achieved using a method for loading a hopper comprising the steps of tipping loose material out in the form of a curtain of material over said hopper, said curtain of material having a lateral extent, splitting said curtain into at least two partial streams, said split being done transversely to said lateral extent, by means of a laterally moveable deflector deflecting each of said partial streams toward a distinct region of the hopper.

By subdividing the curtain of material transversely to its lateral extent into several partial streams, it is possible to make sure that the large and fine particle composition of the partial streams is essentially the same. Indeed, if the distribution of material varies greatly from the front of the curtain of material to the rear, viewed in the direction in which the loose material is conveyed, it is, on the other hand, essentially constant in the direction of the lateral extent of the curtain, that is to say, from left to right. It then follows that dividing the curtain and deflecting the partial streams toward distinct regions of the hopper makes sure that these different regions are loaded with material of comparable composition. This on the whole guarantees a better distribution of material, even though within the partial streams, the segregation phenomenon remains. By varying the position of the laterally moveable deflector, it becomes possible to vary the partial flow width and therefore the amount of material contained in these partial streams.

In a preferred embodiment, the method further comprises the step of regulating the flow rates of material in the partial streams by adjusting the points at which said curtain of material is split. Due to the mechanisms associated with conveying material in loose form, either on a conveyor belt or using skip elevators, the curtain of material is generally thicker in the middle of the curtain than at the outer regions. As a result, the material content of the curtain is higher at the middle of the curtain than on its outside. By choosing the points at which the curtain is split with care, this difference in material content can easily be compensated for. If, for example, the curtain is split into four adjacent partial streams, then the curtain will be subdivided in such a way that the central partial streams are narrower than the outer streams.

In order to ensure good distribution of the material in the hopper, the points at which said curtain of material is split are chosen to make the flow rates of material in said partial stream equal.

According to the invention, a device for distributing loose material, which is intended to be arranged in a curtain of loose material tipped out from a means of conveying loose material, comprises a box with a top opening, at least one wall which extends transversely with respect to said curtain of material inside said box in such a way as to subdivide said box into at least two compartments, and at least two tipping-out means, one of said tipping-out means being associated with each of the compartments of said box, said tipping-out means being directed in such a way as to deflect the material received in the respective compartments into a distinct region of the hopper, and a deflector arranged above the said wall, said deflector being laterally moveable with respect to said wall.

Placed in the curtain of loose material, the dividing wall or walls separating the compartments of the box split the curtain of material into several partial streams of comparable composition. The partial streams are received in the respective compartments of the box and deflected by the tipping-out means into distinct regions of the hopper.

It should be noted that the fact of splitting the curtain of material transversely to its lateral extent ensures essentially equal composition in the partial streams even if the tipping-out point is offset from the central axis of the hopper.

In order to regulate the flow rate of different partial streams, the device comprises at least one deflector arranged above one of the walls, said deflector being laterally moveable with respect to said wall. The deflector comprises, for example, a moving crossmember of a certain width, which extends over the wall. By varying the position of the deflector with respect to the wall, it is possible to modify the width of the top opening of the two compartments adjacent to this wall. It then becomes possible to vary the partial flow width and therefore the amount of material received in each of these compartments. It should be noted that not all of the walls have to be fitted with a deflector. Indeed, in order to be able to regulate the flow rates of the partial streams effectively, it is sufficient for at least one of the walls of each compartment to be equipped with such a deflector.

Said wall or walls preferably extend up to the height of the top opening of the said box. Thus, the curtain is effectively split as soon as it enters the box. This ensures a constant ratio between the amounts of material tipped out into the different regions of the hopper, even if the rate of tipping out differs from one tipping-out means to another.

In an alternative form of the invention, said tipping-out means comprise chutes extending laterally from said box and a bottom of each compartment is inclined toward the respective chute. The chutes may be mounted on the box via a suitable fixing means. In a preferred version, however, each chute is integral with the compartment with which it is associated.

In another alternative form, the box is formed by the feed ends of individual chutes. In this alternative form, said tipping-out means comprise chutes oriented in distinct directions, said chutes being arranged one beside the other so as to form said box having a top opening. The walls of said chutes which extend transversely with respect to said curtain of material then delimit the compartments in said box.

As loose materials often have abrasion properties, it is preferable for the surfaces exposed to the curtain of material or to the partial streams to be coated with an abrasion-resistant material.

The present invention finally relates to a hopper loading installation comprising a means of conveying loose material, said means for conveying loose material tipping the loose material out into a region situated above said hopper in the form of a curtain of material, and a device for distributing loose material as described hereinabove.

Such an installation finds an application in all fields in which a uniform distribution of loose material is desired. It must be noted that the application to loading a chute furnace is merely one example. In addition, it will be obvious that the advantages of the present invention are achieved independently of the conveying means. Hence, the latter may, for example, comprise a conveyor belt or a skip elevator device.

BRIEF DESCRIPTION OF THE DRAWINGS

Other particulars and features of the invention will become apparent from the detailed description of several advantageous embodiments set out hereinbelow by way of illustration with reference to the appended drawings. They show.

DETAILED DESCRIPTION OF THE INVENTION

Figure 1:
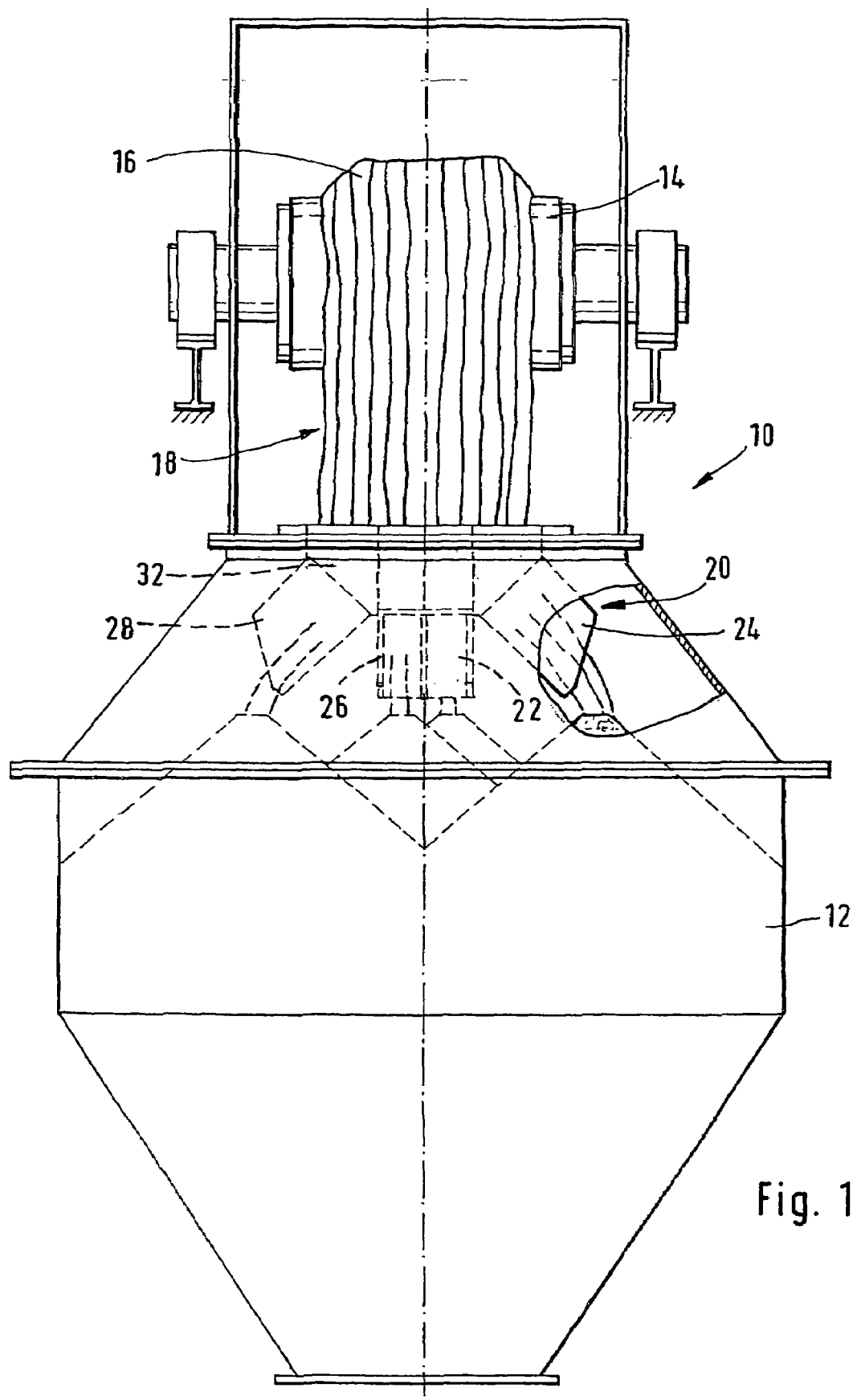
FIG. 1: a front view of a hopper loading installation.
Figure 2:
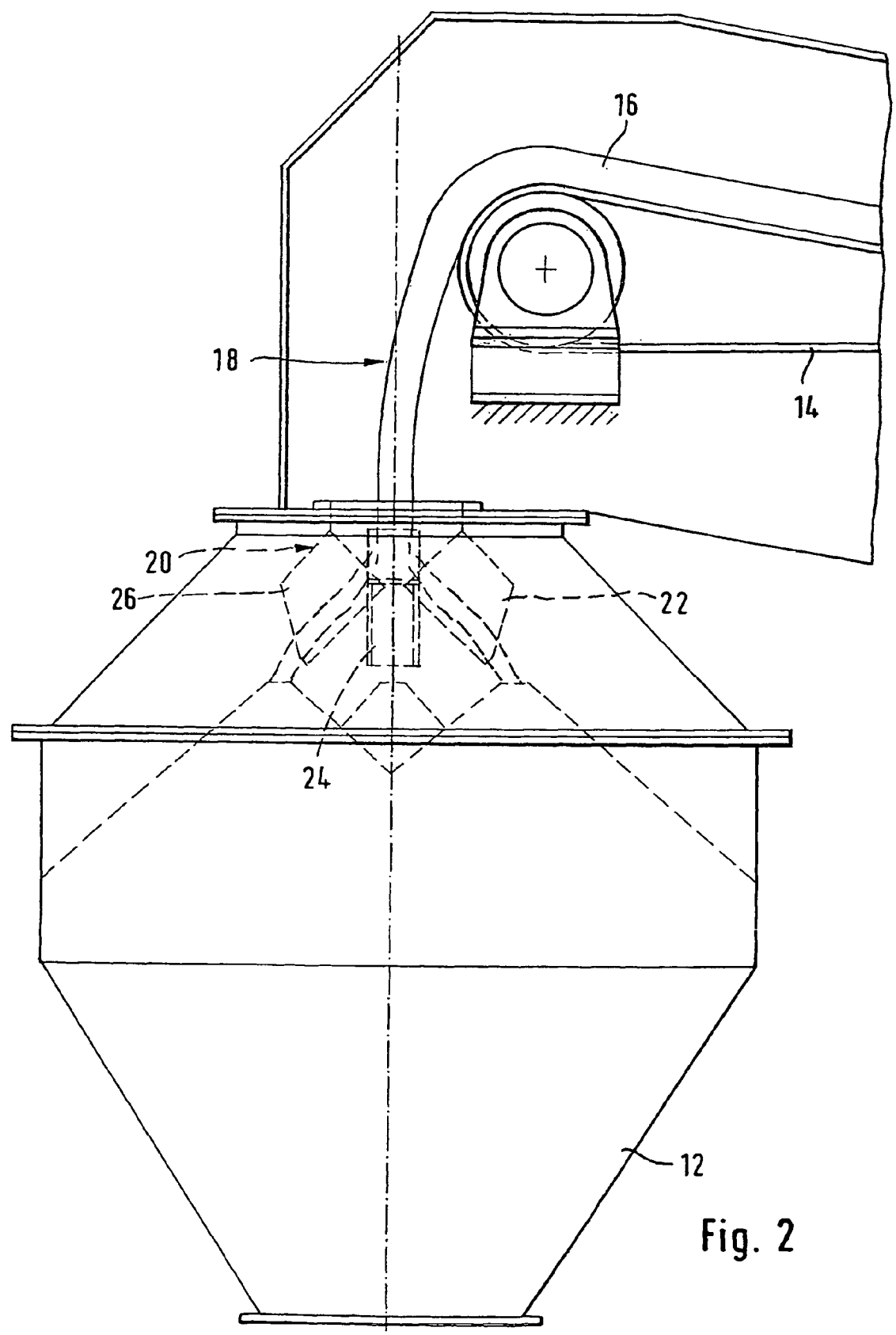
FIG. 2: a side view of the installation of FIG. 1.
Figure 3:
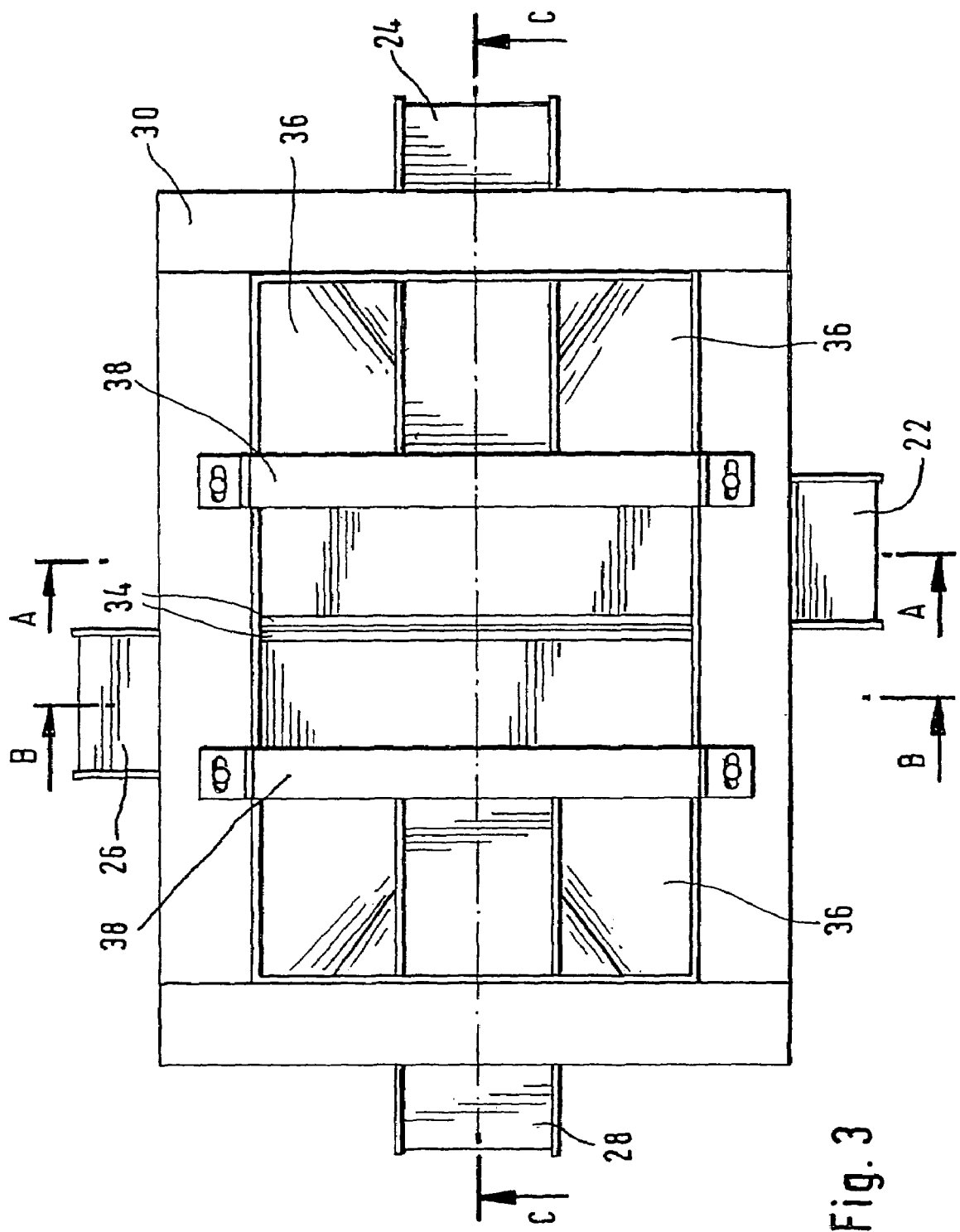
FIG. 3: a plan view of a device for distributing loose material.
Figure 4:
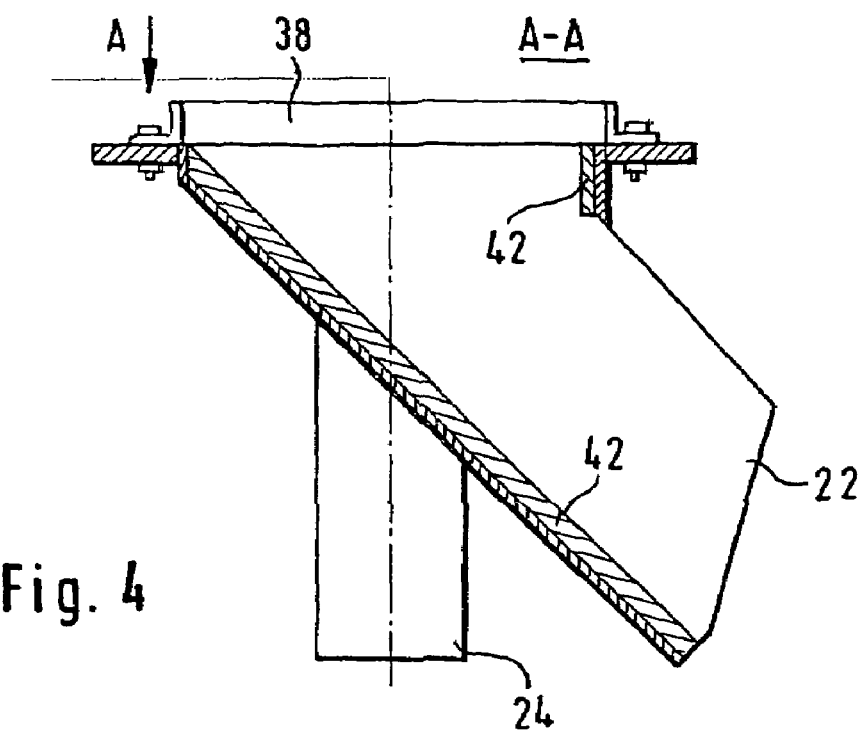
FIG. 4: a section on A-A through the device of FIG. 3.
Figure 5:
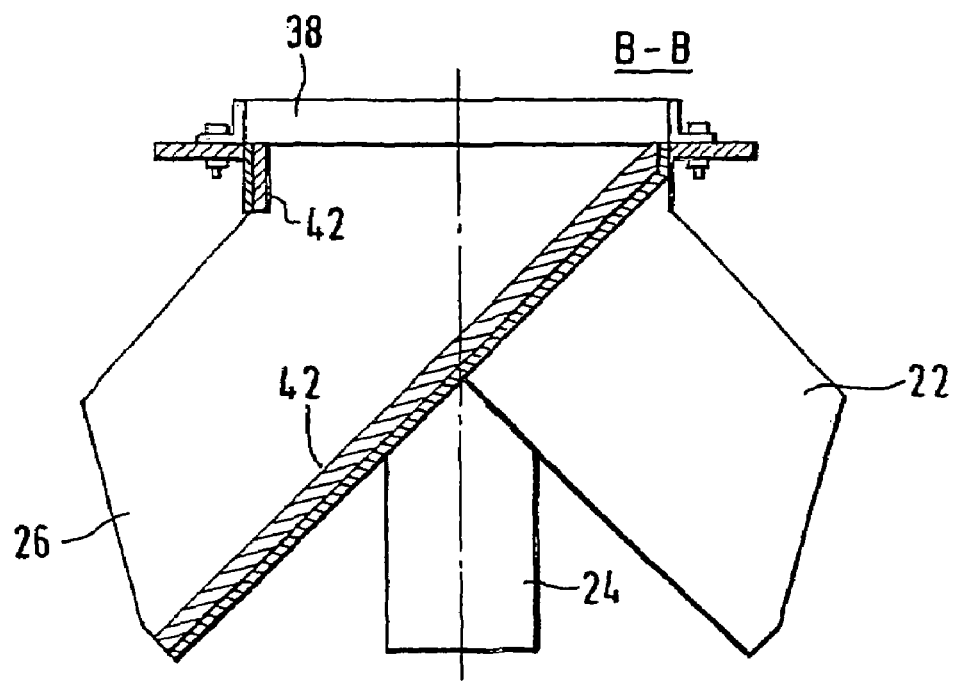
FIG. 5: a section on B-B through the device of FIG. 3.
Figure 6:
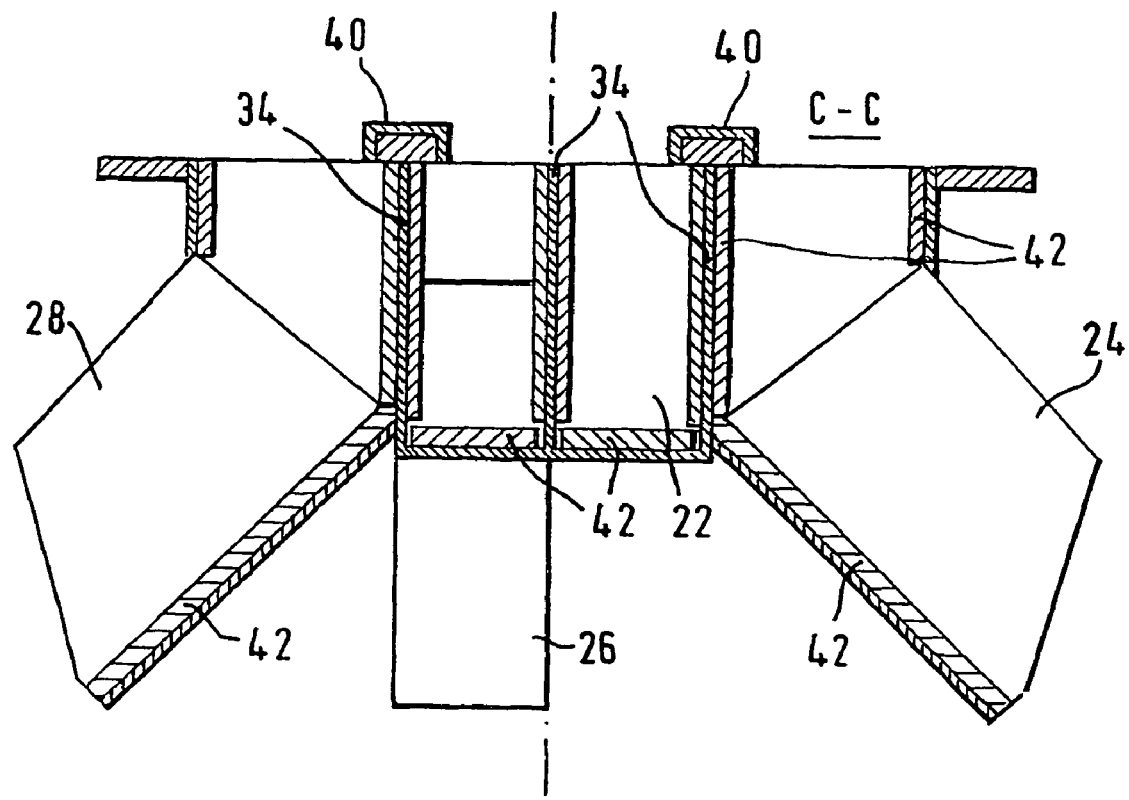
FIG. 6: a section on C-C through the device of FIG. 3.
Figure 7:
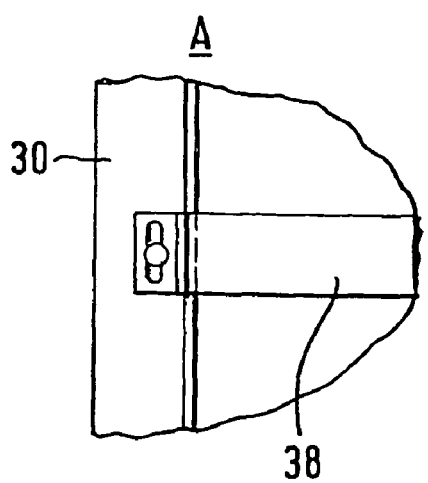
FIG. 7: a detail of the fixing of the deflector crossmembers.

FIGS. 1 and 2 respectively show a front view and a side view of an installation 10 for loading a hopper 12. The installation 10 comprises a conveyor belt 14 which conveys the loose material 16 over the hopper 12. The loose material is tipped out more or less over the central axis of the hopper 12 and therefore falls in the form of a curtain of material 18 into the top opening of the hopper 12.

To ensure good distribution of the loose material within the hopper, a device 20 for distributing loose material is arranged in the top opening of the hopper 12.

The device 20 comprises several chutes 22, 24, 26, 28, which are oriented in distinct directions so as to tip the loose material out into different regions of the hopper. The different chutes are mounted side by side in a top frame 30, so as to form a box 32 which is open at the top and divided into several adjacent compartments by walls 34 of the chutes. The chutes are produced in such a way that the walls delimiting the compartments extend at right angles to the curtain of material, that is to say at right angles to the lateral extent of the curtain 18.

It should be noted that the chutes 24 and 28 extend at right angles to the associated compartments. In order to guarantee a good flow of loose material along these chutes, the bottoms of these associated compartments comprise plates that are inclined toward the respective chutes.

It should be noted that because of the lateral distribution of the curtain of material, the outer compartments are preferably wider than the inner compartments. This is because, due to the mechanisms associated with the conveying of loose material either by a conveyor belt or using a skip elevator, the curtain of material is generally thicker in the middle of the curtain than in the outer regions. The result of this is that the material content of the curtain is higher at the middle of the curtain than on its outside. This lateral distribution of the stream of material is clearly visible in FIG. 1.

In order to be able to vary the opening of the different compartments, and therefore vary the amount of material received in the different compartments, some walls are equipped, at their other ends, with moveable crossmembers 38. These moveable crossmembers 38 are laterally moveable with respect to the associated wall and thus allow the opening of the adjacent compartment to be enlarged or reduced.

It should be noted that all the surfaces exposed either to the curtain of material or to the partial streams inside the chutes are preferably coated with a layer of abrasion-resistant material 40 and/or fitted with wearing plates 42.

The invention claimed is:
1. A method for loading a hopper in a shaft furnace installation comprising the steps of:
 a) tipping out loose material over said hopper in such a way as to cause said loose material to fall in the form of a curtain of material, said curtain of material having a lateral extent,
 b) splitting said curtain into at least two partial streams by means of a laterally moveable deflector arranged in said curtain of material said splitting being done transversely to said lateral extent, c) deflecting each of said partial streams towards a different region of the hopper.

2. The method according to claim 1, comprising the step of regulating the flow rates of material in the partial streams by adjusting the locations at which said curtain of material is split.

3. The method according to claim 1, wherein the locations at which said curtain of material is split are chosen so that the flow rates of material in said partial streams are equal.

4. A device for distributing loose material in a hopper, said device for being arranged in a curtain of loose material tipped out from a means of conveying loose material, said device comprising:
   a) a box with a top opening,
   b) at least one wall which extends transversely with respect to said curtain of loose material inside said box in such a way as to subdivide said box into at least two compartments,
   c) at least two tipping-out means, one of said tipping-out means being associated with each of the compartments of said box, said tipping-out means being directed so as to deflect the material received in the respective compartments into a distinct region of the hopper, and
   d) at least one deflector arranged above the said wall for splitting said curtain of loose material into at least two partial streams, said deflector being laterally moveable with respect to said wall.

5. The device according to claim 4, wherein said wall extends up to the height of the top opening of said box.

6. The device according to claim 4, wherein said tipping-out means comprise chutes extending laterally from said box and wherein a bottom of each compartment is inclined towards the respective chute.

7. The device according to claim 6, wherein each chute is integral with the compartment with which it is associated.

8. The device according to claim 4, wherein said tipping-out means comprise chutes oriented in distinct directions, said chutes being arranged one beside the other so as to form said box having a top opening, the walls of said chutes which extend transversely with respect to said curtain of loose material delimiting the compartments in said box.

9. The device according to claim 4, wherein the surfaces exposed to the curtain of loose material or to the partial streams are coated with an abrasion-resistant material.

10. The device according to claim 4 comprising several walls which extend transversely with respect to said curtain of loose material inside said box so as to subdivide said box into several adjacent compartments, and wherein said at least one deflector arranged above one of said walls.

11. A hopper loading installation for loading a hopper comprising a means of conveying loose material, said means for conveying loose material tipping the loose material out into a region situated above said hopper in the form of a curtain of material, and a device for distributing loose material, said device being arranged in said region above said hopper with respect to said means of conveying loose material in such a way as to be situated in said curtain of loose material when said means of conveying loose material tips out the loose material into said region, said device for distributing loose material comprising:
   a) a box with a top opening,
   b) at least one wall which extends transversely with respect to said curtain of material inside said box in such a way as to subdivide said box into at least two compartments,
   c) at least two tipping-out means, one of said tipping-out means being associated with each of the compartments of said box, said tipping-out means being directed so as to deflect the material received in the respective compartments into a distinct region of the hopper, and
   d) at least one deflector arranged above the said wall for splitting said curtain of loose material into at least two partial streams, said deflector being laterally moveable with respect to said wall.

12. The hopper loading installation according to claim 11, wherein the conveying means comprises a conveyor belt or a skip elevator device.

13. The hopper loading installation according to claim 11, wherein said wall extends up to the height of the top opening of said box.

14. The hopper loading installation according to claim 11, wherein said tipping-out means comprise chutes extending laterally from said box and wherein a bottom of each compartment is inclined towards the respective chute.

15. The hopper loading installation according to claim 11, wherein each chute is integral with the compartment with which it is associated.

16. The hopper loading installation according to claim 11, wherein said tipping-out means comprise chutes oriented in distinct directions, said chutes being arranged one beside the other so as to form said box having a top opening, the walls of said chutes which extend transversely with respect to said curtain of material delimiting the compartments in said box.

17. The hopper loading installation according to claim 11, wherein the surfaces exposed to the curtain of material or to the partial streams are coated with an abrasion-resistant material.

18. The hopper loading installation according to claim 11 comprising several walls which extend transversely with respect to said curtain of material inside said box so as to subdivide said box into several adjacent compartments, and wherein said at least one deflector is arranged above one of said walls.

19. The method according to claim 2, wherein the locations at which said curtain of material is split are chosen so that the flow rates of material in said partial streams are equal.

* * * * *